United States Patent [19]

Okazaki

[11] Patent Number: 4,814,590

[45] Date of Patent: Mar. 21, 1989

[54] METHOD AND APPARATUS FOR TRANSMITTING DATA

[75] Inventor: Kenichi Okazaki, Owariasahi, Japan

[73] Assignee: Hitachi, Ltd., Tokyo, Japan

[21] Appl. No.: 23,240

[22] Filed: Mar. 9, 1987

[30] Foreign Application Priority Data

Mar. 11, 1986 [JP] Japan .................. 61-51467

[51] Int. Cl.⁴ .......................... G06F 15/30
[52] U.S. Cl. ................................. 235/379
[58] Field of Search .............. 235/379, 375, 380

[56] References Cited

U.S. PATENT DOCUMENTS 4,639,889  1/1987  Matsumoto et al. ............... 235/379

FOREIGN PATENT DOCUMENTS 39770  9/1984  Japan .

Primary Examiner—Roy N. Envall, Jr.
Attorney, Agent, or Firm—Antonelli, Terry & Wands

[57] ABSTRACT

Data transmission is performed between a central processing unit and terminal apparatuses in an electronic computer system for use in financial facilities such as banks or the like. When the terminal apparatus receives a series of data blocks which are transmitted from the central processing unit, the terminal apparatus stores a flag to instruct whether the transmission of the next data block from the central processing unit is requested while the received data block is being processed or after the present received data block is processed. This flag is added to each of a plurality of display image plane formats stored in the terminal apparatus.

11 Claims, 3 Drawing Sheets

METHOD AND APPARATUS FOR TRANSMITTING DATA

BACKGROUND OF THE INVENTION

The present invention relates to a data transmitting system for transmitting data between a central processing unit in an electronic computer system and a terminal apparatus and, more particularly, to a data transmitting method whereby in an electronic computer system for use in banking facilities such as banks or the like, the data regarding the transaction of a deposit and a payment is divided into a plurality of data blocks and transmitted from the central processing unit to the terminal apparatuses.

In an electronic computer system, there are many cases where data concerned with a certain process is divided into a few data blocks and the divided data blocks are transmitted from the central processing unit to terminal apparatuses. In this case, in general, after completion of the output process of individual data block the terminal apparatus requests the central processing unit to transmit the subsequent data block. In JP-B No. 59-39770, there has been shown a method whereby before the process of the individual data block is executed, namely, when the data block is received from the central processing unit, the transmission of the next data block is requested in order to reduce the time which is required to complete the processing of all of the data blocks.

According to this method, while the terminal apparatus is processing the received data block, the next data block can be received. Therefore, there is such an effect that it is possible to reduce the time after the terminal apparatus requested the transmission of the next data block until the next data block is received.

In this case, there occurs such a problem that when the request for transmission of the next data block was sent from the terminal apparatus to the central processing unit, the central processing unit determines that the terminal apparatus has finished the process of the preceding data block, so that an inconvenience is caused. This problem becomes serious in the electronic computer system in the banking facility such as a bank or the like. An example will now be explained with respect to the terminal apparatus at a bank. There is a case where an operator in the bank operates the terminal apparatus to allow the data regarding the identifying process to be output from the central processing unit and to be displayed on the display device of his terminal apparatus. In this case, the data such as amount of balance at the bank, list of accounts of savings of the same name, and the like is transmitted from the central processing unit and outputted on the display device. Therefore, even if a failure occurs in the terminal apparatus while the data is being displayed on the screen, if the terminal apparatus again performs the identifying process to the central processing unit, the same data can be transmitted from the central processing unit, so that no inconvenience occurs. However, an inconvenience occurs when the operator operates the terminal apparatus and allows the data concerned with the depositing process to be outputted from the central processing unit to the printer of the terminal apparatus. Namely, the data to be printed to the customer's bankbook, totalization data, and the like are transmitted from the central processing unit to the terminal apparatus in the form of several data blocks. The central processing unit stores the line number of the bankbook to which the printer of the terminal apparatus has printed the data and the total amount of moneys collected. Therefore, before the terminal apparatus prints the data and totalizes the moneys collected, if the terminal apparatus sends the request for transmission of the next data block to the central processing unit, the central processing unit will interpret that the printing or totalization was normally executed, and update the content stored therein. Therefore, if a failure occurred in the terminal apparatus during the printing or totalizing process, a contradiction occurs between the central processing unit and the terminal apparatus. To prevent such a contradiction, according to the technique disclosed in JP-B-59-39770, control data is added to the data block which is transmitted from the central processing unit to the terminal apparatus, and only when the central processing unit permits a request for transmission of the next data block by use of the control data does the terminal apparatus requests the central processing unit to transmit the next data block before the present data block is processed.

However, according to the foregoing method, no consideration is made to a case where the control data indicative of the timing of the request for transmission of the next data block cannot be added to the present data block which is transmitted from the central processing unit to the terminal apparatus. In this case, there is such a problem that the terminal apparatus cannot request transmission of the next data block before the present data block is processed.

For example, it is assumed that three terminal apparatuses are connected to the central processing unit and only one of these terminal apparatuses can discriminate the control data added to the data block transmitted from the central processing unit. In this case, when the central processing unit transmits the same data block to all of the terminal apparatuses, even if the terminal apparatus which can discriminate the data block to which the control data was added is normally operated, the other two conventional terminal apparatuses among the three terminal apparatuses will erroneously discriminate and process the data block to which the control data was added. In this manner, in the electronic computer system having the conventional terminal apparatuses, even if control data is added to a data block which is transmitted from the central processing unit, the electronic computer system still fails to properly operate due to the untimed submission of a data block.

SUMMARY OF THE INVENTION

The present invention is made in consideration of the foregoing circumstances and it is an object of the invention to provide a data transmitting method and apparatus in which even in the case where various types of terminal apparatuses are used, prevents the occurrence of a serious failure in the transmitting of data locks between a central processing unit and the terminal apparatuses by controlling the time at which the next data block is to be transmitted.

According to the invention, when the data block transmitted from the central processing unit is received, data, i.e., a flag indicating whether the request for transmission of a next data block is to be sent before the present data block is processed or after it is processed is added to each of various kinds of image plane formats provided in the terminal apparatus to display flags by the display device of the terminal apparatus.

Terminal apparatuses in a bank will now be described as an example. When the transaction is performed, the operator of a terminal apparatus first selects a transaction image plane and displays it on the display device of the terminal apparatus. The operator then inputs data to be transmitted to a central processing unit onto the transaction image plane of the display device. For example, when the operator performs the deposit transaction or identifying transaction, the operator selects the deposit transaction image plane or identifying transaction image plane by use of the keyboard as the input means, respectively. At this time, with respect to a preceding request flag of the next data block, a flag to instruct that the next data block is requested after the data block is outputted is added to the format data of the deposit transaction image plane. On the other hand, a the flag to instruct that the next data block is requested before the data block is outputted is added to the format data of the identifying transaction image plane. When a the transaction image plane is selected and displayed on the display device, the terminal apparatus stores the preceding request flag into a the memory device in the terminal apparatus.

When the operator inputs the data on basis of items displayed on the screen of the display device and transmits the data to the central processing unit, the bankbook printing data and totalization data in the case of the deposit transaction or the data to be displayed on the screen in the case of the identifying transaction are output from the central processing unit and are divided into a plurality of data blocks and transmitted to the terminal apparatus, respectively. On the basis of the preceding request flag of the next data block stored in the terminal apparatus, the terminal apparatus can request the transmission of the next data block before the received data block is outputted or after the received data block was outputted.

Therefore, without adding control data indicative of the timing to request for the transmission of the next data block from the central processing unit to the terminal apparatus, the terminal apparatus can request the central processing unit to transmit the next data block on the basis of the flag stored in the terminal apparatus.

DESCRIPTION OF THE PREFERRED EMBODIMENT

An embodiment of the present invention will be described in detail hereinbelow with reference to the drawings.

Figure 1:
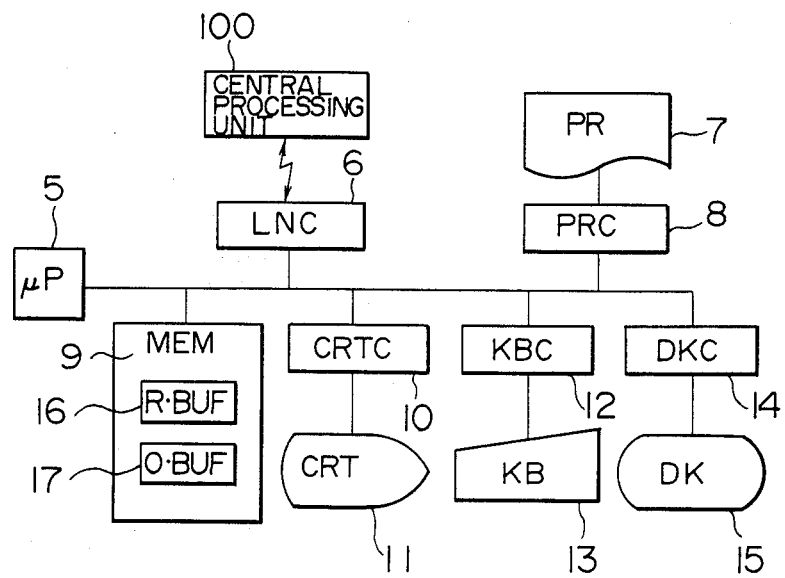
FIG. 1 is a block diagram showing a constitution of a terminal apparatus according to the present invention which is connected to a central processing unit.

FIG. 1 is a control constitutional diagram of a terminal apparatus. In the diagram, reference numeral 5 denotes a processor ($\mu$P) to control the terminal apparatus; 6 is a line control unit (LNC) to connect a central processing unit 100 with the terminal apparatus; 7 a printer (PR) as output means; 8 a printer control unit (PRC); 9 a memory (MEM); 10 a CRT control unit (CRTC); 11 a display device (CRT) as output means having a display screen; 12 a keyboard control unit (KBC); 13 a keyboard (KB) as input means; 14 a disk control unit (DKC); and 15 a disk (DK).

Figure 2:
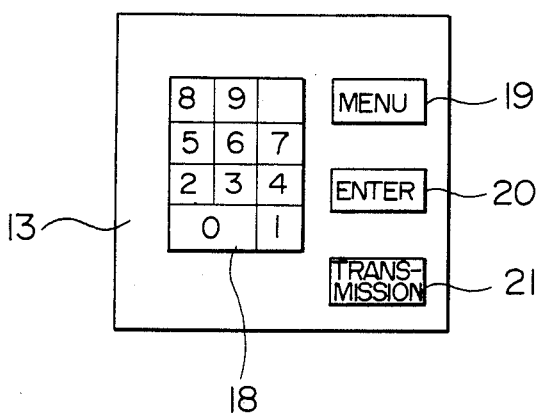
FIG. 2 is a schematic plan view of a keyboard as input means of the terminal apparatus shown in FIG. 1.

FIG. 2 is a plan view of the keyboard 13 by which the operator selects a desired transaction image plane and inputs the necessary data and thereafter, the operator transmits the data to the central processing unit. Numeral 18 denotes a ten-key; 19 is an image plane selection key; 20 an enter key; and 21 a transmission key.

Figure 6A:
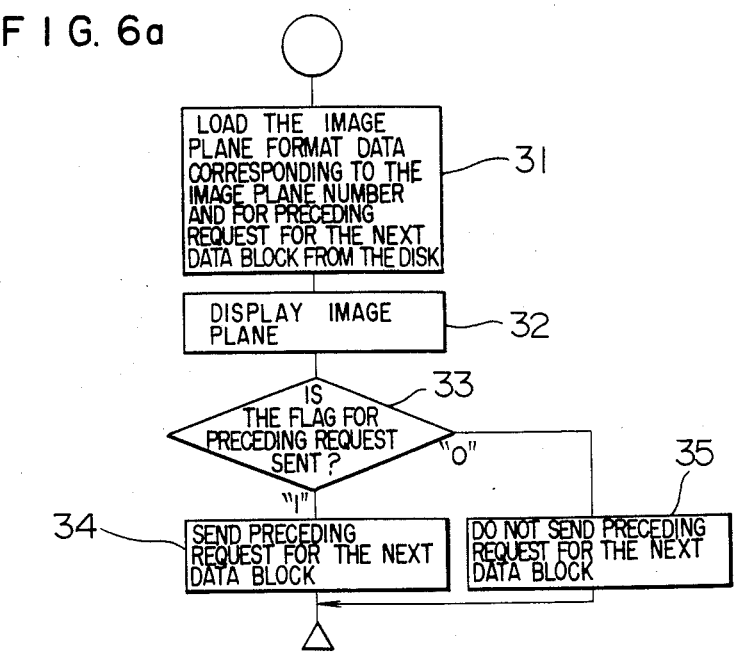
FIGS. 6a and 6b are flowcharts showing an embodiment of a data transmitting method according to the present invention.
Figure 6B:
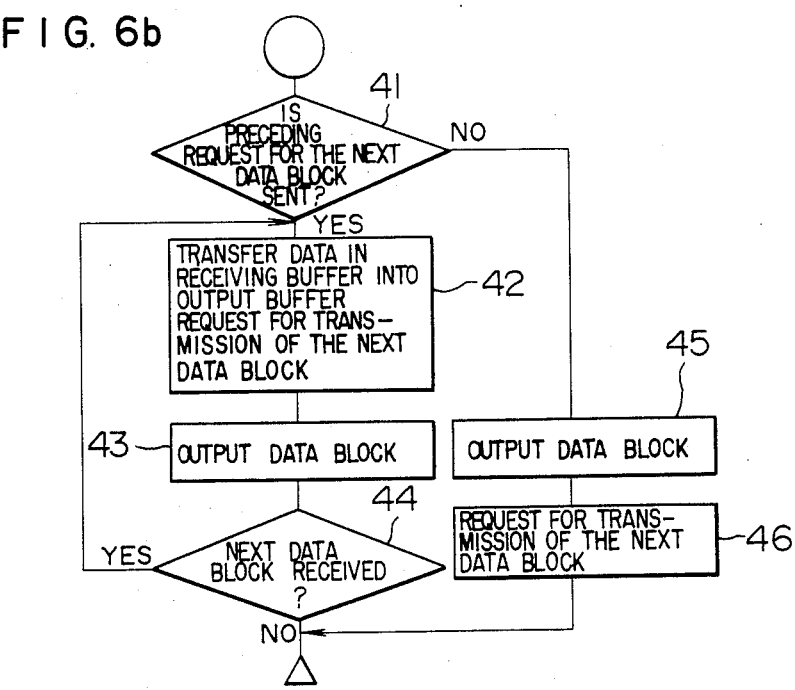

FIGS. 6a and 6b are processing flowcharts showing the operation of the embodiment. FIG. 6a shows the flow of the process which changes on the basis of a flag to instruct the preceding request for the next data block when the operator selected the transaction image plane. FIG. 6b shows the flow of the process to request for the transmission of the next data block when the data block was transmitted from the central processing unit to the terminal apparatus.

The operation of the embodiment will now be described hereinbelow with reference to the foregoing drawings.

In the case of performing the deposit transaction, the operator inputs the image plane number of the deposit transaction image plane by use of the ten-key 18 of the keyboard 13 shown in FIG. 2 and depresses the image plane selection key 19. The signal indicative of the depressed key is sent to the processor 5 through the keyboard control unit 12.

Figure 3:
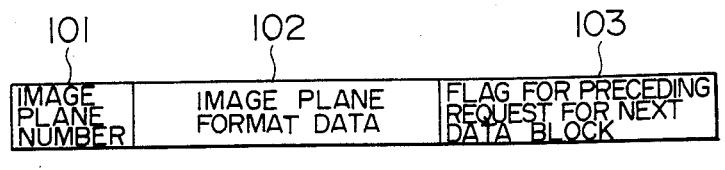
FIG. 3 is a schematic diagram showing an example of an image plane data format to which a flag was added and which is stored in the terminal apparatus.

The processor 5 makes the disk control unit 14 operative on the basis of the program stored in the memory 9 and loads image plane format data 102 of the relevant image plane number 101 and a flag 103 to instruct the preceding request for transmission of the next data block (process 31 in FIG. 6a) as shown in FIG. 3; wherein, the image plane number 101, image plane format data 102, and flag 103 have been stored in the disk 15. The processor 5 displays the image plane of a style corresponding to the image plane format 102 on the display device 11 as the output means by use of the CRTC unit 10 (process 32).

Next, the processor 5 refers to the flag (process 33). If the flag designates that the transmission of the next data block was requested after the present data block was outputted (namely, the flag is set to, e.g., bit "0"), "then the preceding request for transmission of the next data block is not sent" (process 35). If the flag designates that the transmission of the next data block was requested before the present data block is outputted (namely, the flag is set to, e.g., bit "1"), "then the preceding request for transmission of the next data block is sent" (process 34). In this manner, the flag 103 can be expressed by one bit. However, the flag 103 may also be constituted by a plurality of bits.

In the case of the deposit transaction, as mentioned above, if a failure occurred in the terminal apparatus during processing of the data block, when the preceding request for transmission of the next data block is sent before the present data block is processed, a contradiction occurs between the central processing unit and the terminal apparatus. Therefore, the flag 103 which is added to the image plane format data 102 which is used for the deposit transaction image plane is set in such a manner that the request for transmission of the next data block is sent after the present data block was outputted. Namely, in the case of the deposit transaction, the preceding request for transmission of the next data block is not sent (process 35).

Next, the operator inputs the data to predetermined positions within the image plane of the display device 11 by use of the ten-key 18 and enter key 20 and depresses the transmission key 21. The signal indicative of the transmission key 21 is supplied to the processor 5 similarly to the case of the image plane selection key 19. The processor 5 transmits an input data block 1 shown in FIG. 4 to the central processing unit 100 by use of the line control unit 6.

Figure 4:
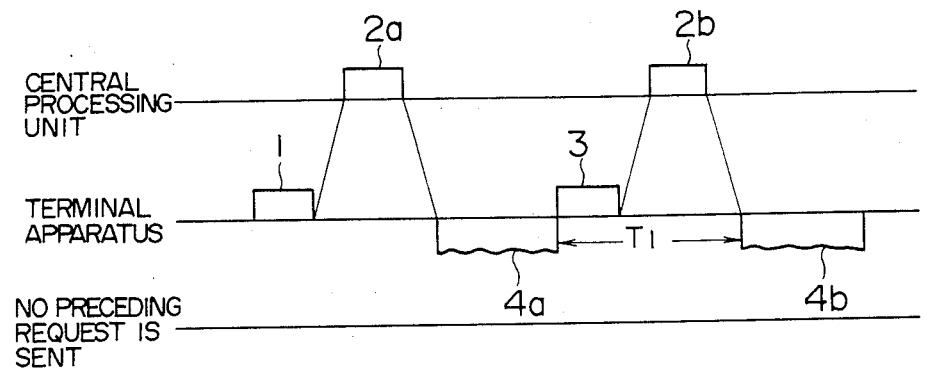
FIG. 4 is a time chart in a case where the request for transmission of the next data block is sent after the terminal apparatus outputted the present data block.

In FIG. 4, the central processing unit 100 transmits an output data block 2a to the terminal apparatus. The output data block 2a in the deposit transaction includes the bankbook printing data, slip printing data, totalization data, and the like. These data are stored into a receiving buffer 16 in the memory 9 in FIG. 1.

Subsequently, processes are executed in accordance with the flow chart shown in FIG. 6b. Since the preceding request is not sent in the case of the deposit transaction, the present data block is outputted (processes 41 and 45). The printing data as much as the present data block is printed by the printer 7 as the output means by use of the printer control unit 8. The totalization data is stored into the memory 9. The output processing time of the data block is shown at 4a in FIG. 4.

After the data block was outputted, a request 3 for transmission of the next data block is sent to the central processing unit 100 by use of the line control unit 6 (FIG. 1) (process 46 in FIG. 6b). Thus, the central processing unit 100 transmits the next data block 2b.

In the case of the identifying transaction, the operator selects the identifying transaction image plane by use of the keyboard 13 in accordance with the procedure similar to that of the foregoing deposit transaction. In this case, the flag 103 added to the image plane format data 102 for the identifying transaction is set to "1", namely, the flag 103 designates that the transmission of the next data block is requested before the present data block is outputted. Therefore, the preceding request for transmission of the next data block is sent in accordance with the flow chart shown in FIG. 6a (processes 33 and 34).

Figure 5:
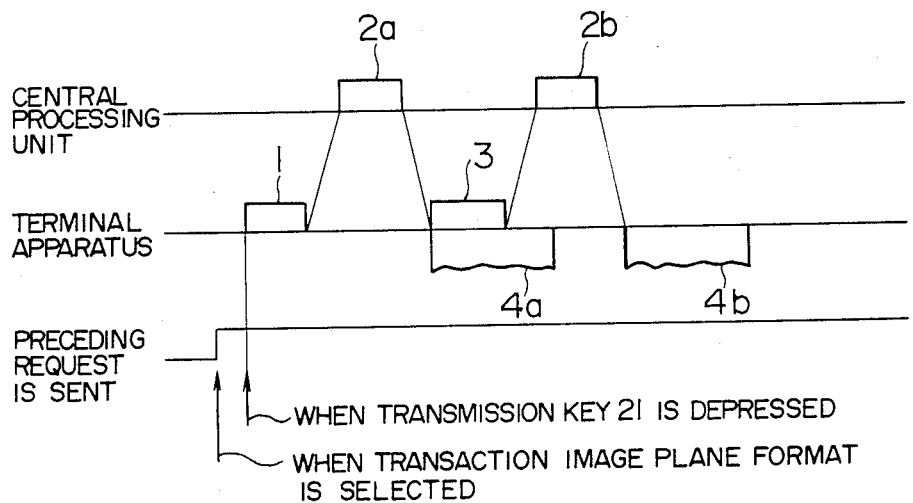
FIG. 5 is a time chart in a case where the request for transmission of the next data block is sent before the terminal apparatus outputs the present data block.

Similarly to the deposit transaction, when the operator depresses the transmission key 21 and transmits the input data block 1 shown in FIG. 5 to the central processing unit 100, the image plane data or the like of the display apparatus is transferred as the data block 2a to the terminal apparatus from the central processing unit 100. In the case of the identifying transaction, even if a failure occurred in the terminal apparatus while the terminal apparatus is processing the data block which is transmitted from the central processing unit, when the terminal apparatus again performs the identifying transaction to the central processing unit, the same data is transmitted from the central processing unit, so that no inconvenience will occur. Consequently, the flag to be added to the image plane format data as shown in FIG. 3 to indicate the format of the image plane of the display apparatus 11 in the case of the identifying transaction is set to "1", namely, the preceding request is sent. Therefore, in accordance with the flow chart shown in FIG. 6b, the processor 5 transfers the data block in the receiving buffer 16 into an output buffer 17, and the supplying of the request 3 for transmission of the next data block to the central processing unit is started before the present data block is outputted (process 42).

Thereafter, the present data block is outputted (process 43). The image plane data is displayed on the screen of the display device 11 as the output means and outputted by the printer as necessary. When the data block is being outputted, if the next data block is transmitted from the central processing unit, this data block is stored into the receiving buffer 16.

After the data block was outputted, a check is made to see if the next data block has been received into the receiving buffer 16 or not (process 44). If it has been received, the data in the receiving buffer 16 is transferred into the output buffer 17 and processed in a manner similar to the above.

According to this embodiment, the output processing time of the whole image plane for the identifying transaction per data block can be reduced by the time corresponding to the output time 4a shown in FIG. 5 without changing the data block from the central processing unit.

Although an example of the terminal apparatus in the bank has been explained in the foregoing embodiment, the present invention is not limited to only this example. The invention can be also applied to other systems having a similar constitution.

On the other hand, even in the bank terminal apparatus, the invention is not limited to the cases of the deposit transaction and identifying transaction but can be also similarly applied to other transactions.

As described above, according to the invention, there is the following effect. Namely, by changing an instruction of the request for transmission of the next data block included in the terminal apparatus in accordance with the content of the transaction without changing the data block which is transmitted from the central processing unit to the terminal apparatus, the output processing time of the data block can be reduced every data block by the time corresponding to only the output processing time of one data block when the output processing time 4a or 4b of one data block is shorter than the period of time $T_1$ shown in FIG. 4.

When the output processing time of one data block is longer than the time $T_1$, the output processing time can be reduced every data block by only the period of time $T_1$.

I claim:

1. A data transmitting method in a terminal apparatus connected to a central processing unit in which said terminal apparatus includes transmitting means for requesting said central processing unit to transmit data blocks from said central processing unit, receiving means for receiving said data blocks which are transmitted from said central processing unit, output means for outputting externally said data blocks received by said receiving means, and input means for inputting data from an operator, said data transmitting method comprising the steps of:

(a) transmitting a plurality of data blocks from said central processing unit to said terminal apparatus and storing a flag indicating a first or second state for controlling the time of issuance of a request for the next data block;

(b) referring to said stored flag; and (c) receiving a data block from said central processing unit and requesting said central processing unit, by said transmitting means, to transmit the next data block after said received data block is outputted by said output means when said flag being referred to indicates said first state, and receiving a data block from said central processing unit and requesting said central processing unit, by the transmitting means, to transmit the next data block before said received data block is outputted by said output means when said flag being referred to indicates said second state.

2. A data transmitting method according to claim 1, wherein said output means includes an image plane display means for displaying image planes and said step (a) comprises the step of:

(a1) selecting one of a plurality of image plane formats in response to data input by said operator and displaying said selected image plane format by said image plane display means, a flag with respect to said request for the next data block being added to each image plane format; and (a2) storing flags added to selected image plane formats.

3. A data transmitting method according to claim 1, wherein said step (c) is repeated until said terminal apparatus completes reception of all of said plurality of data blocks from said central processing unit.

4. A data transmitting method according to claim 2, wherein said plurality of data blocks from said central processing unit are related said selected one image plane format, and said step (c) is repeated until said terminal apparatus completes reception of all of said plurality of data blocks from said central processing unit.

5. A data transmitting method according to claim 1, wherein said step (c), said data block from said central processing unit is stored in a receiving buffer in said terminal apparatus, and when said flag indicates said second state, said data block in said receiving buffer is transferred to an output buffer in said terminal apparatus and thereafter, the next data block is stored in said receiving buffer.

6. A data transmitting method according to claim 1, wherein said plurality of data blocks from said central processing unit are data related to financial transactions at a bank.

7. A data transmitting method according to claim 1, wherein said output means includes a printer.

8. A terminal apparatus connected to a central processing unit, said terminal apparatus comprising:

transmitting means for requesting said central processing unit to transmit a plurality of data blocks;

receiving means for receiving said data blocks transmitted from said central processing unit;

output means for externally outputting said data blocks received by said receiving means;

input means for selecting one of a plurality of image plane formats by inputting data from an operator;

flag memory means for storing a flag indicating a first or second state for controlling the time of issuance of a request for the next data block from said control processing unit in response to said data input by said input means, said flag being added to said selected image plane format;

image plane display means for displaying an image plane corresponding to said selected image plane format; and means for determining in accordance with said flag stored in said flag memory means that when said flag indicates said first state, said receiving means receives a data block from said central processing unit and after said received data block is outputted by at least one of said output means and said image plane display means, said transmitting means requests said central processing unit to transmit the next data block, and when said flag indicates said second state, said receiving means receives a data block from said central processing unit and before said received data block is outputted by at least one of said output means and said image plane display means, said transmitting means request said central processing unit to transmit the next data block.

9. A terminal apparatus according to claim 8, further comprising:

a receiving buffer, connected to said receiving means, for storing said data block transmitted from said central processing unit; and and output buffer, connected to said output means, for storing said data block to be outputted externally by said output means or said image plane display means;

10. A terminal apparatus according to claim 8, wherein said output means is a printer.

11. A data transmitting device for performing data transmission between a central processing unit and a terminal apparatus in an electronic computer system, said data transmitting system includes a central processing unit and a terminal apparatus connected to said central processing unit, said terminal apparatus comprising transmitting means for requesting said central processing unit to transmit data blocks;

receiving means for receiving said data blocks transmitted from said central processing unit;

output means for externally outputting said data blocks received by said receiving means;

input means for selecting one of a plurality of image plane formats by inputting data from an operator;

flag memory means for storing a flag indicating a first or second state for controlling the time of issuance of the next data block from said central processing unit in response to said data input by said input means, said flag being added to said selected image plane format;

image plane display means for displaying an image plane corresponding to said selected image plane format; and means for determining in accordance with said flag stored in said flag memory means that when said flag indicates said first state, said receiving means receives a data block from said central processing unit and after said received data block is outputted by at least one of said output means and said image plane display means, said transmitting means requests said central processing unit to transmit a next data block, and when said flag indicates said second state, said receiving means receives said data block from said central processing unit and before said received data block is outputted by at least one of said output means and said image plane display means, said transmitting means requests said central processing unit to transmit said next data block.

* * * * *